(12) United States Patent
Iacobucci

(10) Patent No.: US 10,130,208 B2
(45) Date of Patent: Nov. 20, 2018

(54) POD-HOLDER

(75) Inventor: Lucio Iacobucci, Ferentino (IT)

(73) Assignee: IACOBUCCI HF ELECTRONICS S.P.A., Ferentino (IT)

( * ) Notice: Subject to any disclaimer, the term of this patent is extended or adjusted under 35 U.S.C. 154(b) by 606 days.

(21) Appl. No.: 14/342,722

(22) PCT Filed: Sep. 4, 2012

(86) PCT No.: PCT/IT2012/000269
§ 371 (c)(1),
(2), (4) Date: Jun. 4, 2014

(87) PCT Pub. No.: WO2013/035120
PCT Pub. Date: Mar. 14, 2013

(65) Prior Publication Data
US 2014/0331217 A1 Nov. 6, 2014

(30) Foreign Application Priority Data

Sep. 5, 2011 (IT) .............................. RM2011A0458

(51) Int. Cl.
| | | |
|---|---|---|
| A47J 31/40 | (2006.01) | |
| A47J 31/36 | (2006.01) | |
| A47J 31/44 | (2006.01) | |
| G06F 8/65 | (2018.01) | |
| A47J 31/00 | (2006.01) | |

(52) U.S. Cl.
CPC ......... *A47J 31/407* (2013.01); *A47J 31/3623* (2013.01); *A47J 31/3633* (2013.01); *A47J 31/3638* (2013.01); *A47J 31/4467* (2013.01); *G06F 8/65* (2013.01); *A47J 31/005* (2013.01)

(58) Field of Classification Search
CPC .......... A47J 31/52; A47J 31/047; A47J 31/56; A47J 31/3614; A47J 31/3619; A47J 31/3695; A47G 19/14; B65D 85/8043
USPC .............. 99/280, 281, 282, 283, 288, 289 D, 99/289 P, 290, 295, 296
See application file for complete search history.

(56) References Cited

U.S. PATENT DOCUMENTS

| | | | | |
|---|---|---|---|---|
| 4,797,296 A | * | 1/1989 | Meier .................. | A47J 31/3619 |
| | | | | 426/231 |
| 5,134,925 A | * | 8/1992 | Bunn ...................... | A47J 31/40 |
| | | | | 210/499 |

(Continued)

FOREIGN PATENT DOCUMENTS

| | | |
|---|---|---|
| DE | 201 05 672 U1 | 9/2001 |
| DE | 20 2008 015 035 U1 | 1/2009 |

(Continued)

OTHER PUBLICATIONS

International Search Report for PCT/IT2012/000269 dated Jan. 25, 2013.

*Primary Examiner* — Ibrahime A Abraham
*Assistant Examiner* — Jimmy Chou
(74) *Attorney, Agent, or Firm* — Themis Law

(57) ABSTRACT

The present invention relates to a pod-holding device (100) for a beverage dispensing machine. The pod-holding device comprises a first (7) and a second (11) extraction subunit, the first extraction subunit (7) sealingly closing against the second subunit (11) so as to form, when closed, an extraction chamber for the pod, and, when open, allow insertion of the pod between the two subunits (7, 11).

8 Claims, 15 Drawing Sheets

(56) References Cited

U.S. PATENT DOCUMENTS

| | | | | |
|---|---|---|---|---|
| 5,230,277 | A * | 7/1993 | Bianco | A47J 31/3609 99/287 |
| 5,911,810 | A * | 6/1999 | Kawabata | A47J 31/3652 99/289 P |
| 6,779,435 | B1 * | 8/2004 | Iacobucci | A47J 31/005 392/449 |
| 6,799,503 | B2 | 10/2004 | Kollep | A47J 31/369 99/289 R |
| 7,059,239 | B2 * | 6/2006 | Balkau | A47J 31/0673 99/295 |
| 7,237,475 | B2 * | 7/2007 | Chen | A47J 31/0626 99/289 R |
| 7,350,456 | B2 * | 4/2008 | Blanc | A47J 31/3633 99/295 |
| 7,507,430 | B2 * | 3/2009 | Stearns | A47J 31/41 426/474 |
| 7,513,192 | B2 * | 4/2009 | Sullivan | A47J 31/3695 99/279 |
| 7,617,763 | B2 * | 11/2009 | Chen | A47J 31/0626 99/289 R |
| 7,673,555 | B2 * | 3/2010 | Nosler | A47J 31/007 426/433 |
| 7,707,927 | B2 * | 5/2010 | Boussemart | A47J 31/061 99/275 |
| 8,039,033 | B2 * | 10/2011 | Van Hattem | A47J 31/22 426/433 |
| 8,247,010 | B2 * | 8/2012 | Nguyen | A47J 31/3619 426/433 |
| 8,567,304 | B2 * | 10/2013 | Saxton | A47J 31/46 426/433 |
| 8,770,095 | B2 * | 7/2014 | Pecci | A47J 31/3633 99/295 |
| 2004/0112222 | A1 | 6/2004 | Fischer | |
| 2006/0016347 | A1 * | 1/2006 | Girard | A47J 31/407 99/295 |
| 2008/0050480 | A1 * | 2/2008 | Doglioni Majer | A47J 31/3609 426/231 |
| 2008/0121111 | A1 * | 5/2008 | Paget | A47J 31/0668 99/295 |
| 2008/0264266 | A1 * | 10/2008 | Carbonini | A47J 31/3609 99/289 R |
| 2008/0282897 | A1 * | 11/2008 | Webster | A47J 31/56 99/280 |
| 2009/0114100 | A1 * | 5/2009 | Spinelli | A47J 31/0668 99/289 R |
| 2009/0293733 | A1 * | 12/2009 | Martin | A47J 31/60 99/280 |
| 2010/0147873 | A1 * | 6/2010 | Tanner | A47J 31/3638 99/295 |
| 2011/0000377 | A1 * | 1/2011 | Favre | A47J 31/3628 99/289 R |
| 2011/0036244 | A1 * | 2/2011 | Chatterjee | A47J 31/3642 99/283 |
| 2011/0041701 | A1 * | 2/2011 | Chatterjee | A47J 31/3642 99/295 |
| 2011/0212229 | A1 * | 9/2011 | McLaughlin | A47J 31/3614 426/231 |
| 2011/0212231 | A1 * | 9/2011 | McLaughlin | A47J 31/36 426/231 |

FOREIGN PATENT DOCUMENTS

| | | |
|---|---|---|
| EP | 1 767 129 A1 | 3/2007 |
| WO | 2002/091891 | 11/2002 |
| WO | 2006/126230 A1 | 11/2006 |
| WO | WO 2006126230 * | 11/2006 |

* cited by examiner

POD-HOLDER

FIELD OF THE INVENTION

The present invention relates to a pod-holding device for a beverage dispensing machine. In particular, the device according to the invention may be used for machines for dispensing hot beverages such as coffee, espresso coffee, long coffee, tea and/or water.

PRIOR ART

Various pod-holding devices for beverage dispensing machines used both in the home and in the aviation and/or naval sector, for example in yachts and on boats in general, are known. In the aviation and naval sector a first urgent problem is that of the lack of space and therefore the dispensing machines have particularly small dimensions and are without parts projecting from their profile. Moreover, the problems posed by the constant movement must also be taken into account. This types of devices finally must satisfy specific requirements laid down by strict regulations.

Pod-holding devices are described in U.S. Pat. No. 6,779,435 and WO2002/091891. However, in both these documents the pod-holding devices are bulky and a potential source of danger. For example, the patent application WO2002/091891 describes a pod-holder, outside the coffee machine, which is operated by means of a handle system for performing closing and connection to the water supply. This arrangement may be dangerous owing to the parts projecting from the machine. Moreover, insertion and extraction of the pod after preparation of the beverage may be difficult, the first of these operations requiring care during positioning of the pod and cleaning of the pod-holder itself, and the second requiring the use of gripping means even in the case of used pods provided with a tongue.

U.S. Pat. No. 6,779,435 instead describes a heating system which supplies water directly onto the pod, closing by means of lowering onto a pod-holding drawer. The drawer occupies the whole of the front of the machine and the pod must be manually eliminated when the drawer is opened after use. The lack of practicality and safety of this system is evident.

Italian utility model MU 262188 in the name of the same Applicant describes a drawer-type pod-holding device in which the drawer is not completely and freely extractable. Relative operation of the heater and pod-holder is performed by means of a mechanical lever system which is operated externally and moves a heater downwards so as to close the pod-holder. This results in poor manoeuvrability of the drawer during cleaning and loss of liquids to the detriment of the hygiene of the location where the machine is housed, as well as potential dangers due to the presence of external lever controls projecting in an unacceptable manner from the profile of the machine.

For the preparation of the hot beverages it is envisaged using prepackaged single-dose or multiple-dose capsules, typically in the form of pods, which contain the ingredient to be brought into contact with the water, such as coffee powder, tea or other powder component to be reconstituted in order to prepare a beverage. Pods for automatic devices are known where each pod consists of a single dose—in some cases precompressed—of coffee powder, and in particular aluminium pods and paper pods are known. The outer casing is made of filter paper or other plastic or metal wrapping which is perforated or, where appropriate, pierceible and through which hot water and/or steam at a predefined temperature may pass for preparation of the beverage.

Particular pod-holding devices of the known type consist of two half-shells, i.e. a top shell and bottom shell, which act as an extraction chamber and which receive between them the pod to be extracted after use. These devices envisage that the sealed closure of the two half-shells is performed by means of spring systems or hydraulic systems or hinge-type systems connecting together the top and bottom half shells, and that expulsion of the used pod is performed by means of sliding. These systems have the disadvantage that, if paper pods are used, they are not expelled by means of sliding with the same ease as aluminium pods, but instead remain attached to the support shells and also that the devices as a whole are bulky and difficult to arrange inside small-size dispensing machines.

A pod-holding device is described in international patent application WO2006/126230 as having two half-shells, i.e. a top shell and a bottom shell. The bottom half-shell moves along a horizontal guide from a first pod-receiving position to a second position opposite the top half-shell for forming the extraction chamber to a third position for expulsion of the used pod. The presence of the three positions makes the system less reliable owing to possible problems resulting from easy misalignment of the top and bottom half-shells. Moreover, the expulsion of the pod in the third position functions by making use also of the gravity associated with the weight of the pod, but it may easily happen, in particular with paper pods, that these remain attached to the filter and do not slide off. Furthermore, in order to perform overturning of the pod, a hinged system of pins, pulleys and end-of-travel stops is required, making the device complicated from a manufacturing point of view.

A pod-holding device has now been designed which is such that it overcomes the drawbacks of the prior art, facilitates use and cleaning by the user and in particular is designed to fit into the small spaces of the current beverage-dispensing machines, in particular those of the inset type.

The device is more durable, easier to use, safer and has dimensions smaller than those known hitherto. Further advantages of the invention will become clear from the following detailed description.

SUMMARY OF THE INVENTION

The present invention relates to a pod-holding device which can be mounted on machines able to dispense hot beverages such as coffee, long coffee, milk, chocolate, tea and/or hot water in accordance with the accompanying claims. The pod-holding device according to the invention is characterized in that the sealed closure is performed using a motor-driven screw system which acts on the top half-shell of the extraction chamber, the components of the device being configured and formed as described in the accompanying claims.

Further objects will become clear from the detailed description of the invention which follows.

BRIEF DESCRIPTION OF THE DRAWINGS

For a better understanding of the invention, the accompanying figures show a non-limiting example of the said invention.

DETAILED DESCRIPTION OF THE INVENTION

Figure 1:
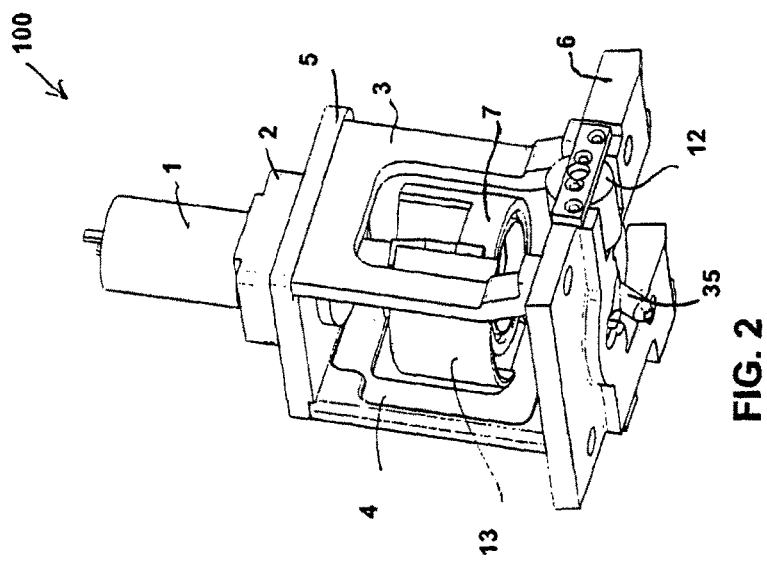
FIG. 1 shows a schematic, perspective, three-quarter view of the set of motor units of the pod-holding device.
Figure 2:
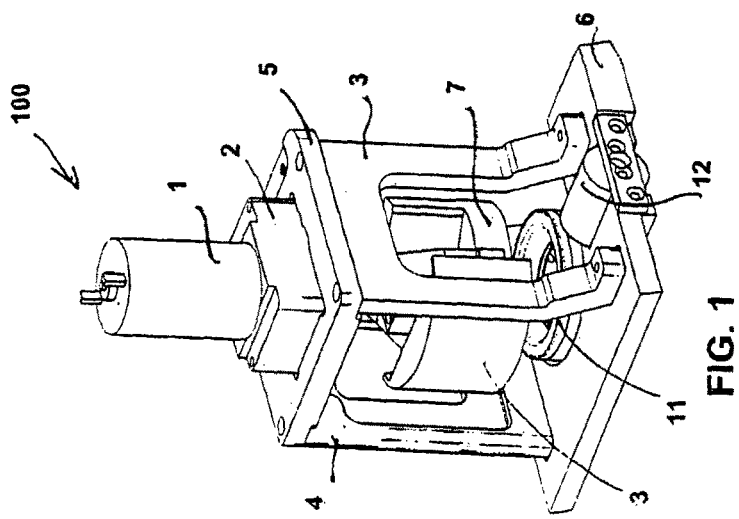
FIG. 2 shows a schematic, perspective, three-quarter view, from below, of the set of motor units of the pod-holding device according to FIG. 1.
Figure 3:
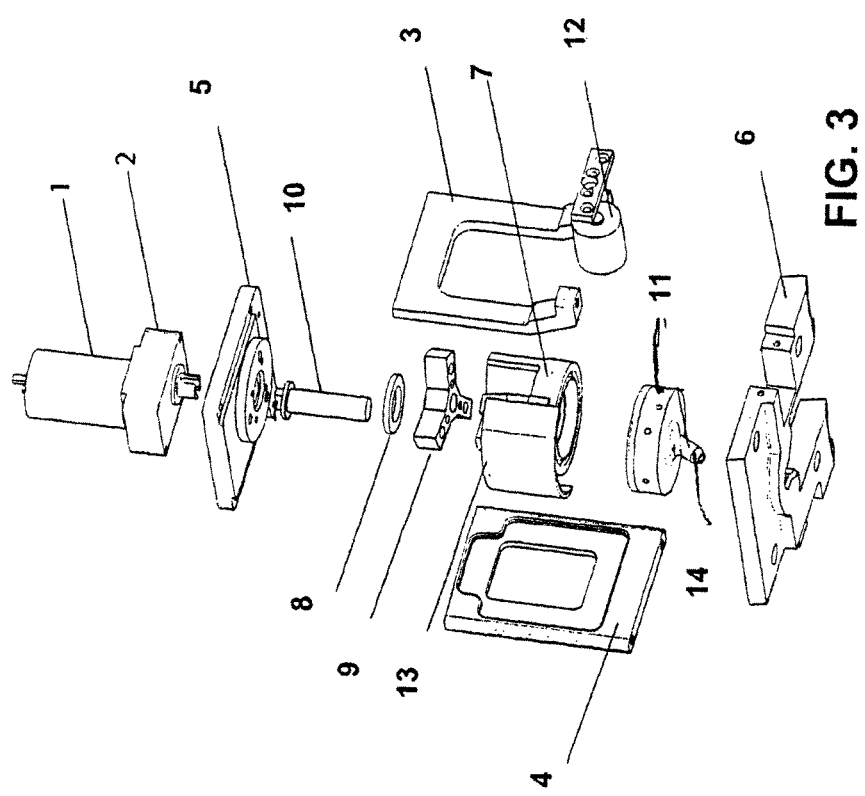
FIG. 3 is an exploded view of the pod-holding device according to FIG. 1.

The pod-holding device according to the invention is suitable for housing pods containing a substance to be extracted or reconstituted by means of the flow of hot water, such as coffee, milk, tea, chocolate, etc.

The device comprises a first and a second extraction subunit, the first extraction subunit sealingly closing against the second subunit so as to form, when closed, an extraction chamber for the pod and, when open, allow insertion of the pod between the two subunits.

A characteristic feature of this device is that the sealed closure is performed neither by means of spring systems nor using hydraulic systems nor using hinge-type systems connecting together the top and bottom shells which form the extraction chamber.

The first subunit is movable, and is also called the movement unit or head unit or simply block "A", and comprises a first motor or top motor, advantageously, connected to a reduction gear, an anti-seizing transmission screw, with associated mechanical support and nut operationally connected to the top half-shell. The support may be essentially a locking washer which locks the screw on the top plate. The nut, or screw nut, has the function of converting the circular motion of the linearly moving screw and transferring it to the top half-shell.

The second subunit is also called the bottom filter holder or simply block "B" and is designed to receive the pod and to expel it after extraction; it comprises the bottom half-shell which is operationally connected to a second motor unit or bottom motor for expulsion of the pod and further parts configured and formed as described by the accompanying claims.

In a simplified variant of the bottom filter-holder unit the second motor is replaced by an extractable drawer.

With reference to the figures, pod-holding devices for beverage dispensing machines denoted overall by the reference number 100 are shown.

FIGS. 1 to 5 show the pod-holding device according to the present invention which comprises a top motor 1 advantageously associated with a reducer 2 supported by a pair of shaped support plates 3 and 4 connecting together a top plate 5 and a bottom plate 6. The support plates 3 and 4 are spaced from each other and may for example have shaped through-recesses respectively in the form of an overturned "U" in the case of the plate 3 and a closed rectangle in the case of the plate 4.

In an alternative embodiment (not shown) the support plates 3 and 4 are replaced by rods or support members for the top plate 5 and bottom plate 6.

The operational components which are operated by the top motor 1 and by the reducer 2 of the pod-holding device are arranged between the plates or support members 3 and 4 and comprise overall a top filter head or unit 7, a nut 9 and a support 8 for a transmission screw 10. A bottom filter unit 11 is supported by the bottom plate 6 and aligned with the top filter unit 7.

The bottom filter unit 11 is designed to rotate about a horizontal axis preferably through an angle of about 90 degrees or less, and even more preferably through an angle of about 20°-65°, operated by a second motor unit or bottom motor 12 having preferably an axis perpendicular to that of the top motor 1. The bottom motor 12 is for example housed inside a space in the plate 6 so as to be coplanar therewith and transfer simply the rotational movement to the bottom filter unit 11.

The top filter unit 7, the transmission screw 10, the nut 9, the support 8 and a safety element 13 form a block "A" consisting of parts moved vertically by the motor 1 and by the reduction gear 2 during dispensing of the beverage.

The bottom filter unit 11 and bottom motor 12 form a block "B" and form the expulsion system, in which the bottom filter unit 11 is vertically fixed but rotatable about a horizontal axis.

A safety element 13 is envisaged and is used during the downward movement of block A for formation of the beverage together with detection systems which check for the presence of any obstacles between the parts of the top block A and the parts of the bottom block B and interrupt the dispensing cycle described below.

The top motor 1 is designed to move the system until it encloses a pod 66 arranged between the top filter unit 7 and the bottom filter unit 11, while the bottom motor 12 is intended to perform rotation of the bottom filter 11 so as to expel the used pod with a "catapulting" action. With this arrangement of the parts, it is possible to use preferably aluminium or paper pods, even more preferably paper pods which are expelled not by means of sliding from the bottom filter unit 11, but owing to rotation of the latter, being catapulted out and falling into the underlying receiving drawer 61 assisted by a containment plate 62 mounted on top of the receiving drawer.

Figure 4:
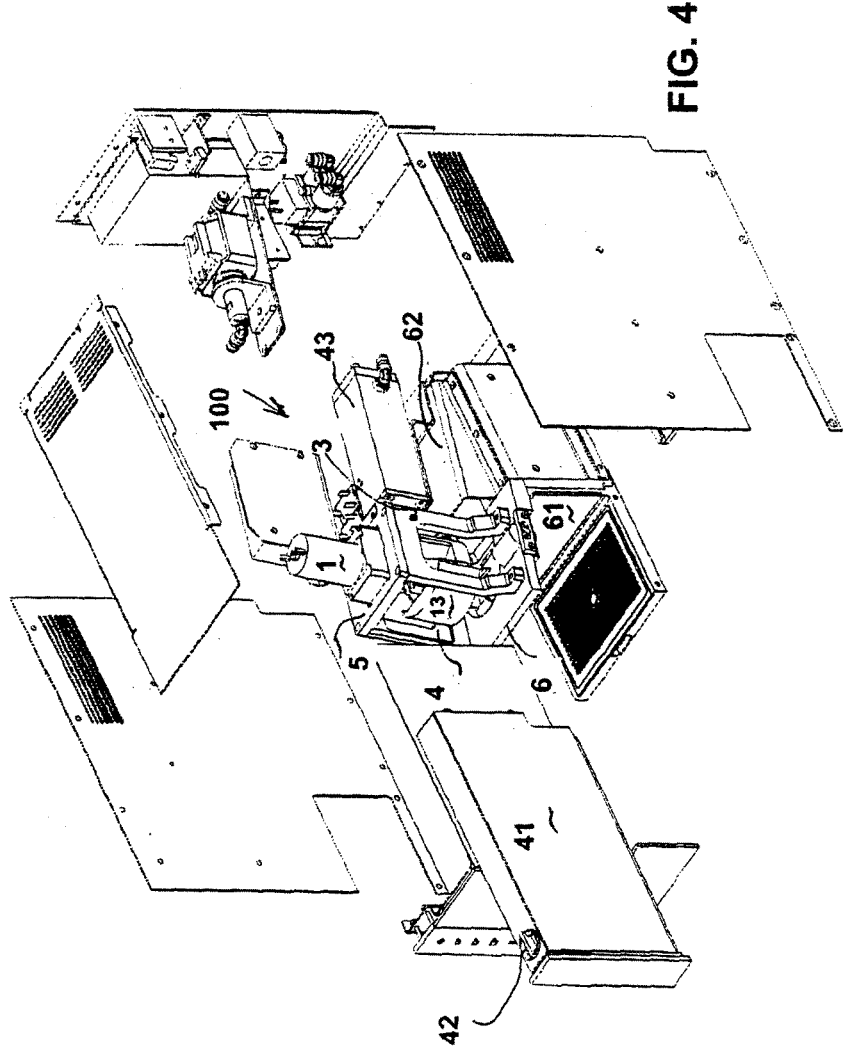
FIG. 4 shows a schematic, right-hand side perspective view of the pod-holding device according to FIG. 1 contained in a beverage dispensing machine shown in exploded form.
Figure 5:
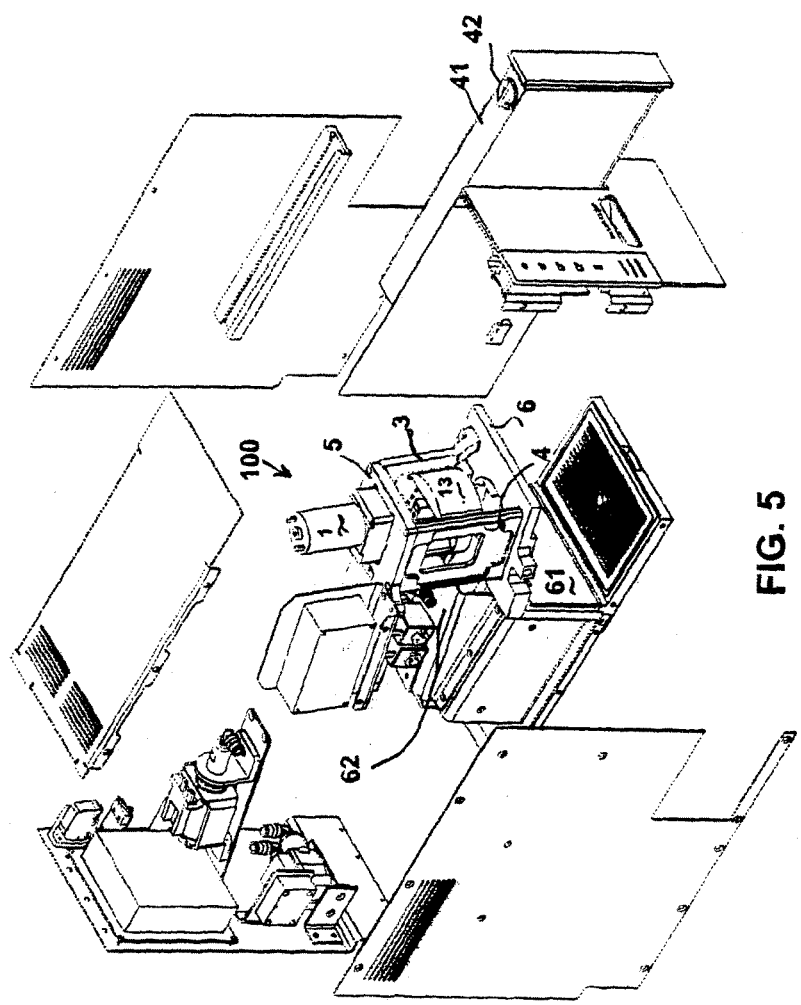
FIG. 5 shows a schematic, left-hand side perspective view of the pod-holding device according to FIG. 1 contained in a beverage dispensing machine shown in exploded form.
Figure 6:
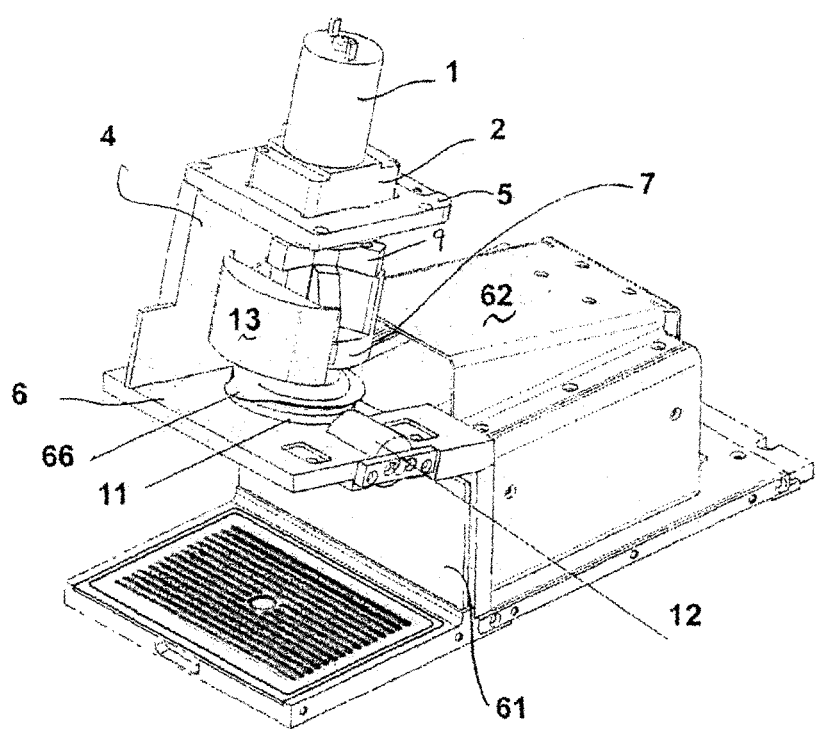
FIG. 6 shows a schematic, right-hand side perspective view of the pod-holding device according to FIG. 5 assembled on the associated receiving drawer, where the pod-holder contains the pod and is coplanar with the bottom plate 6.
Figure 7:
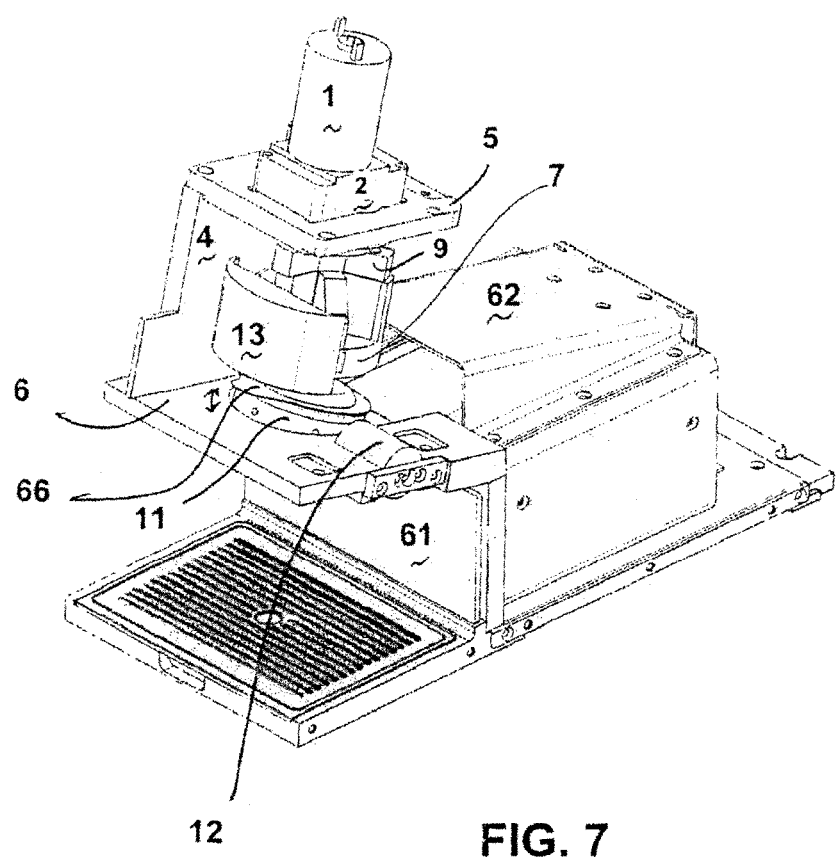
FIG. 7 is the same view as FIG. 6 with the bottom filter unit 11 slightly rotated along the axis of the bottom motor 12 relative to the bottom plate 6 in the direction indicated by the arrows.
Figure 8:
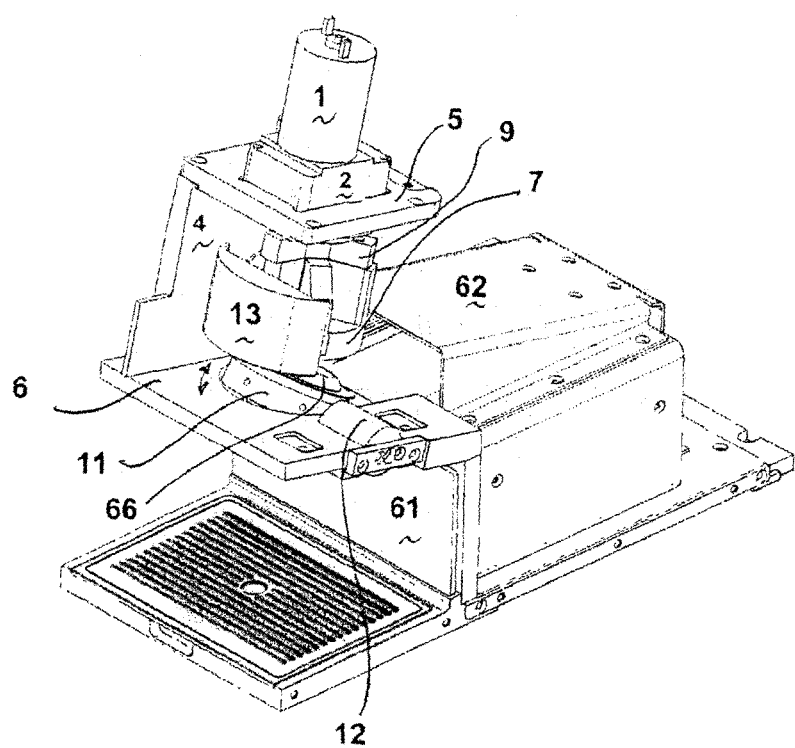
FIG. 8 is the same view as FIG. 7 with the bottom filter unit 11 further rotated in the direction indicated by the arrows.
Figure 9:
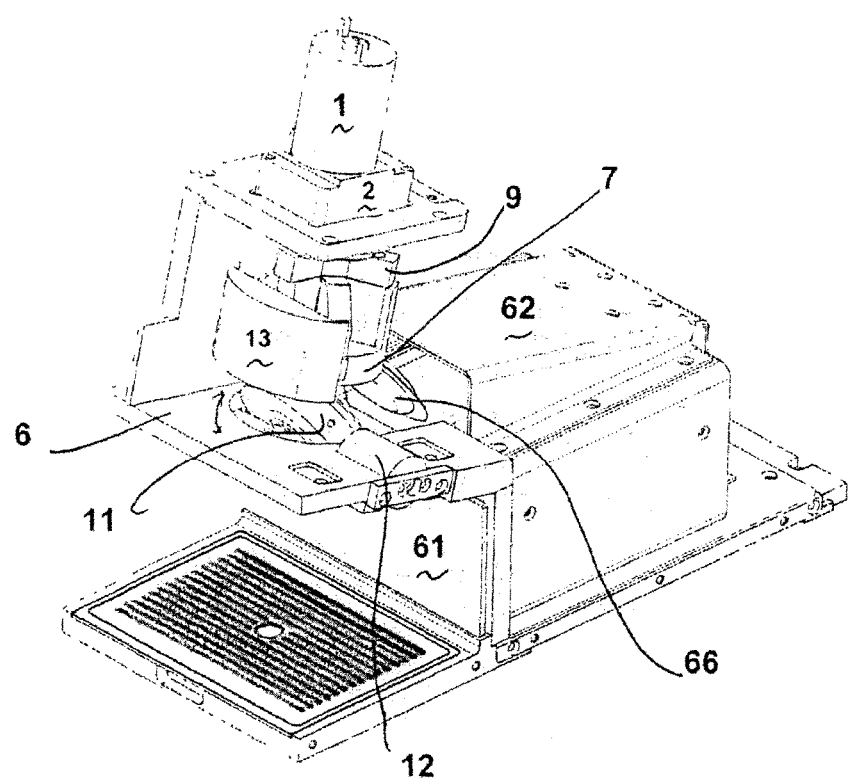
FIG. 9 is the same view as FIG. 8 with the bottom filter unit 11 further rotated in the direction indicated by the arrows with the pod being expelled towards the drawer (shown closed)
Figure 10:
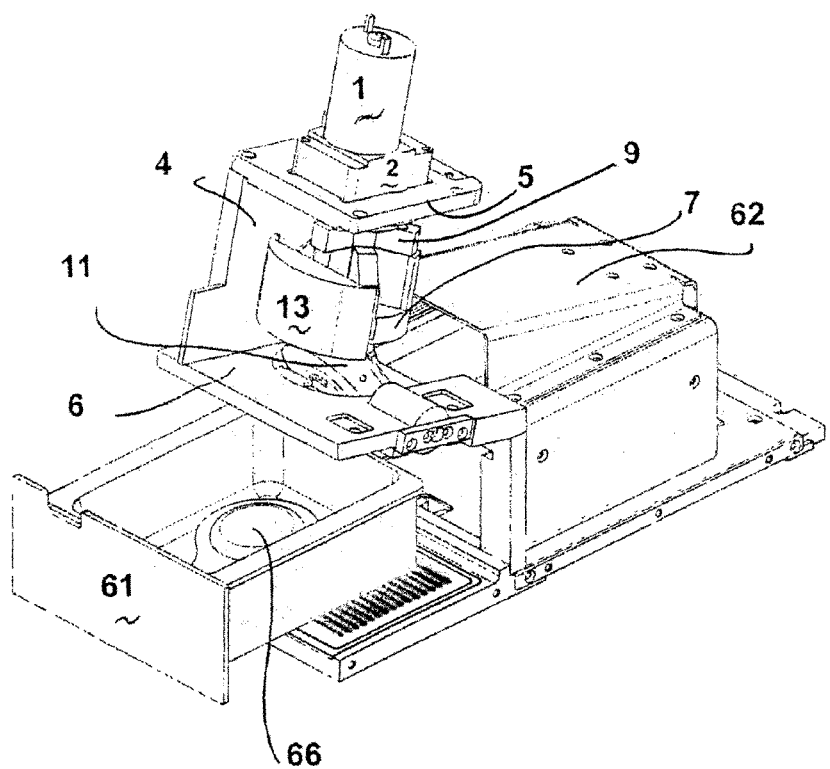
FIG. 10 shows the same view as FIG. 9 with the pod expelled inside the drawer (shown open)
Figure 11:
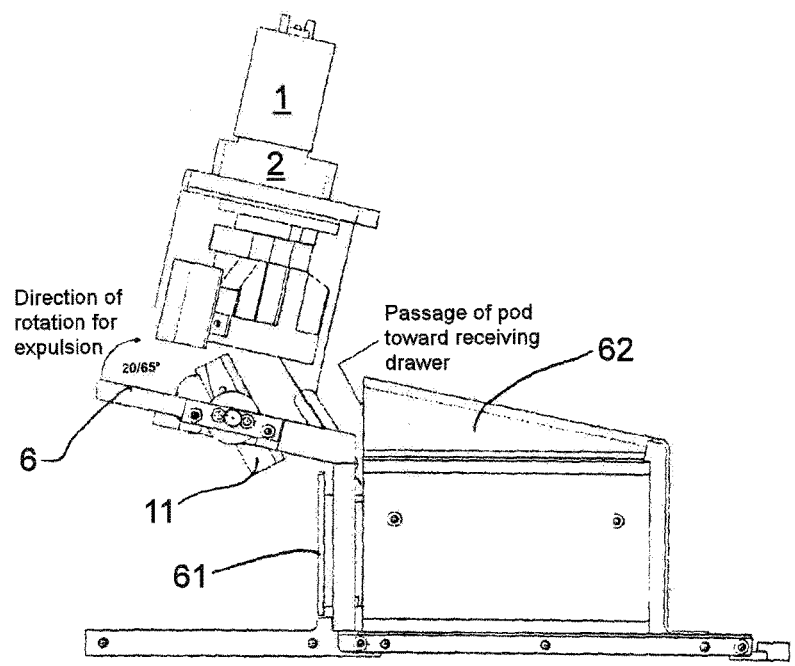
FIG. 11 is a schematic side view of the pod-holding device assembled on the associated receiving drawer, in which the rotation of the pod-holder relative to the bottom plate 6 is clearly visible.
Figure 13:
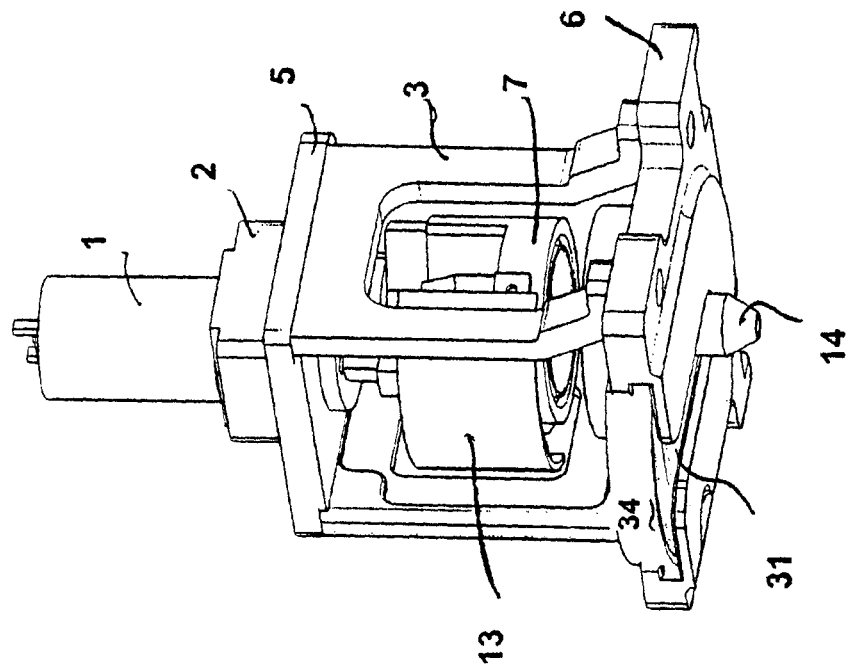
FIG. 13 shows a schematic, perspective, three-quarter view, from below, of the alternative embodiment according to FIG. 12.
Figure 12:
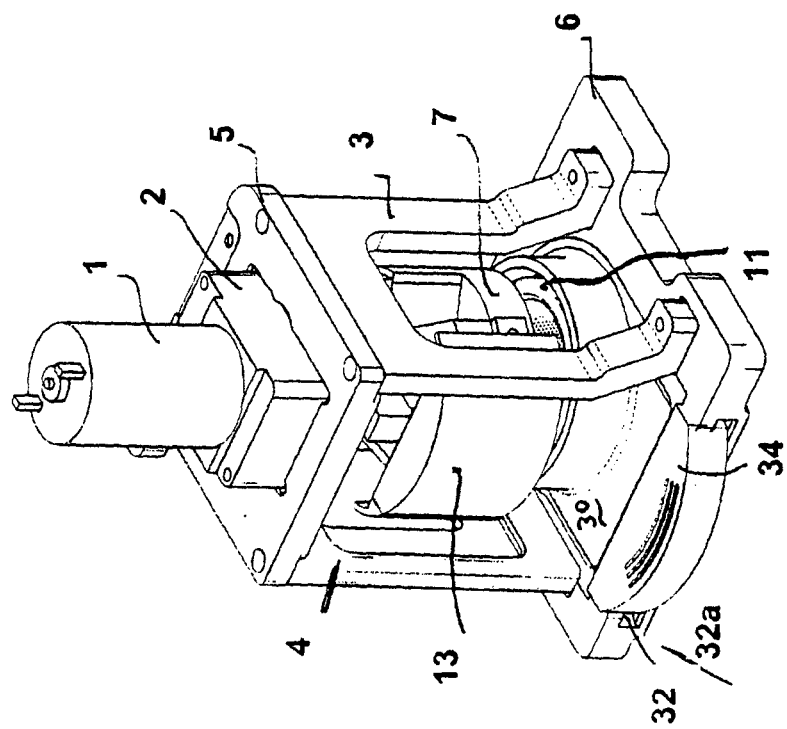
FIG. 12 shows a schematic, perspective, three-quarter view of an alternative embodiment of the pod-holding device according to the invention.
Figure 14:
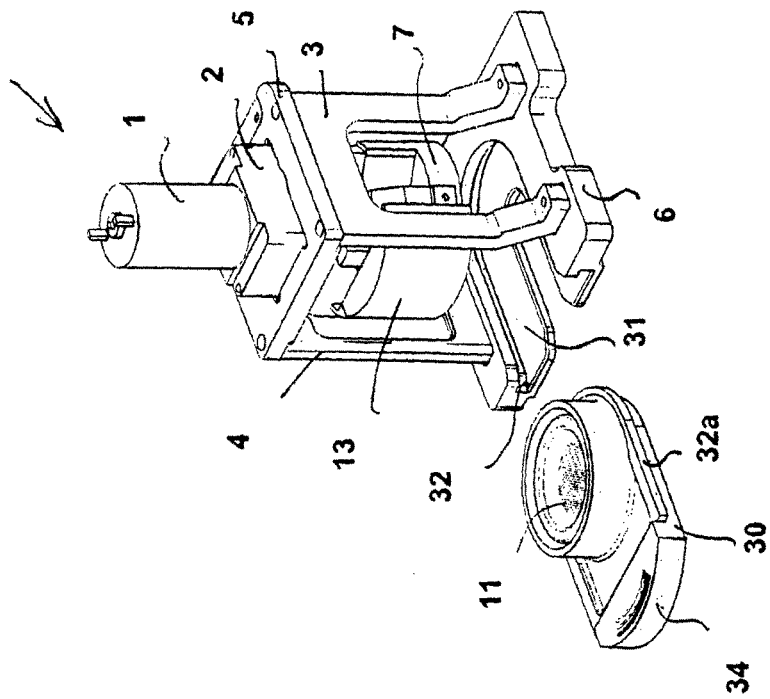
FIG. 14 shows a schematic, perspective, three-quarter view of the alternative embodiment according to FIG. 12 with the pod-holder drawer extracted.
Figure 16:
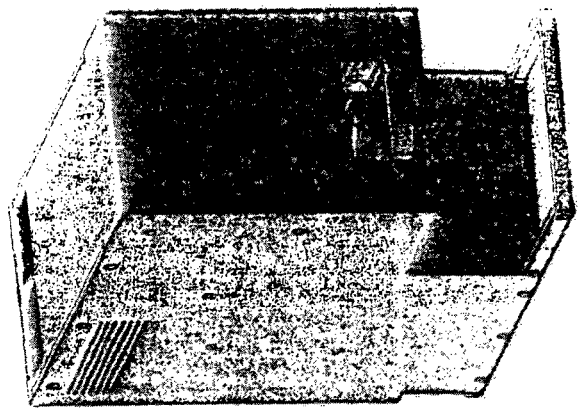
FIG. 16 shows a schematic, left-hand side perspective view of the alternative embodiment of FIG. 6 contained in a beverage-dispensing machine.
Figure 15:
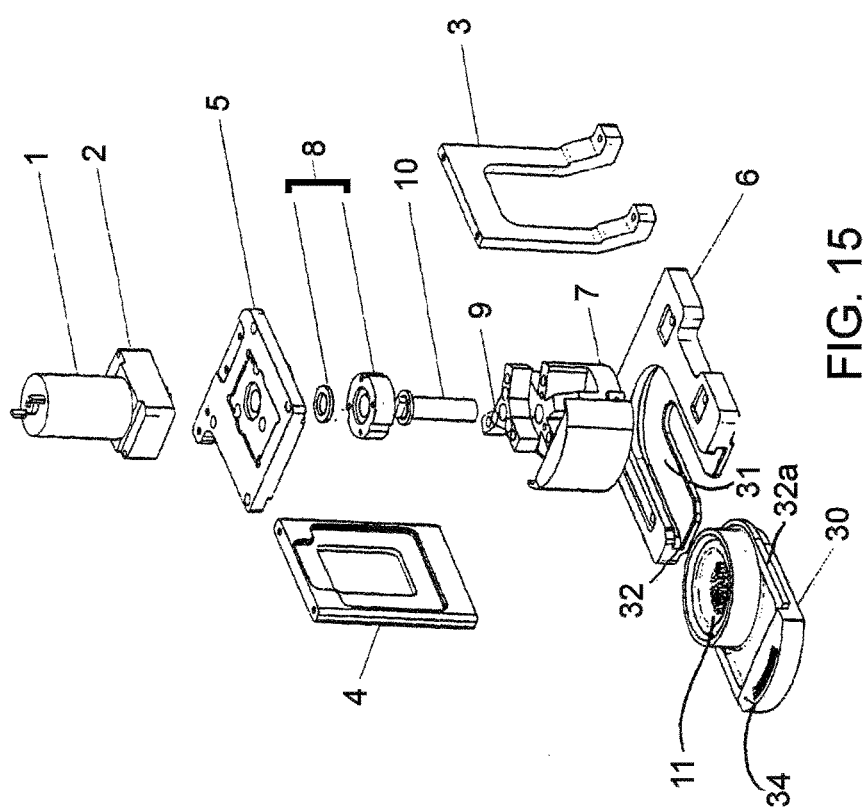
FIG. 15 is an exploded view of the pod-holding device according to FIG. 12.

With reference in particular to FIGS. 4 and 5, the pod-holding device 100 according to the present invention is shown positioned inside a machine for dispensing beverages, for example made from coffee or tea, with the plates 5 and 6 arranged inclined relative to the horizontal bottom plane of the machine. Advantageously, the machine may be provided with a water container 41 provided with a closing cap 42 and connected to a heater 43 via connections known per se (not shown). The heater 43 supplies hot water to the top filter unit 7 via the connection means known per se (not shown). Operation of the machine containing the pod-holder is managed by a microcontroller using suitable control firmware.

Once the pod has been positioned on the bottom filter unit 11, when dispensing of a beverage is required, the top motor 1 is activated such that, via the reducer 2, it operates the transmission screw 10, being mechanically coupled to the latter via coupling means known per se.

The transmission screw 10, advancing along the threaded nut 9, with its movement causes the movement also of the top filter unit 7. When the top filter unit 7 comes to rest on the bottom filter unit 11, the top motor 1 is stopped and consequently all the parts which were in movement are stopped, so as to perform closing of the extraction chamber assisted by a sealing element of the circular O-ring type.

During this step the pod-holder is sealed so that it is possible to start dispensing of the beverage; the hot water enters into the top filter unit 7 via a suitable union (not shown), passes through the pod and flows out as a beverage from the outlet opening 14 of the bottom filter unit 11. Dispensing ends once the quantity prechosen for that given function has flowed out.

At this point the top motor 1 is activated again and, with a reverse motion, returns to the previous top position, which may be located by means of an encoder, position microswitch, torque detection system or equivalent systems.

The following step consists in expulsion towards the receiving drawer of the pod used for dispensing. The operation is performed by activating the bottom motor 12 which is mechanically connected to a reduction system a directly via its shaft to the bottom filter unit 11, first in one direction and immediately thereafter in the other direction. This movement generates a rotation which simulates a "catapulting" action, favouring removal of the pod towards the receiving drawer 61. Likewise this movement may be further controlled by means of an encoder, position microswitch, torque detection system or equivalent systems. The rotational movement is illustrated in detail in FIGS. 6 to 11.

FIGS. 12 to 16 show a simplified embodiment of the present invention in which the bottom plate 6 of the block B is without the bottom motor 12 and the bottom filter unit 11 is housed inside a drawer 30 which slides inside the associated sliding seat 31 formed in the bottom plate 6. The drawer 30 may be extracted fully from the pod-holding device by applying to the outer end of the drawer 30 a light pulling force, substantially at right angles to the front part of the beverage dispensing machine, so to cause sliding of the specially provided reliefs 32a inside the guides 32 formed in the bottom plate 6. The bottom filter unit 11 housed inside the drawer 30 has a suitable—preferably circular—shape such as to house the pod both during dispensing of the beverage and during extraction of the used pod.

Once the pod has been loaded in the filter unit 11, by means of a light pushing action the drawer 30 is made to slide along the guides 32 to the end-of-travel position where the bottom filter unit 11 and top filter unit 7 are precisely aligned.

The form of the filter unit 11 may be adapted to the form of the various types of pods produced by the manufacturers of coffee or tea or other types of beverages. The pod-holding device according to the present invention is particularly suitable for receiving pods with a preferably circular base and substantially flat form, with a thickness of about 1 cm, with or without either an aluminium or paper tongue.

The pods may also be of the piercible type and in this case the top filter unit 7 and/or bottom filter unit 11 will be advantageously provided with piercing systems which are known per se.

Advantageously, the drawer 30 has a projection 34 with a suitable shape so as to facilitate opening of the drawer 30 with the fingers or using any other suitable means.

Once the pod has been positioned on the bottom filter unit 11 and the drawer inserted inside the corresponding sliding seat 31, when dispensing of a beverage is required, the top motor 1 is activated such that, via the reducer 2, it operates the transmission screw 10, being mechanically coupled to the latter via coupling means known per se. The transmission screw 10, advancing along the nut 9, with its movement causes the movement also of the top filter unit 7. When the top filter unit 7 comes to rest on the bottom filter unit 11, the top motor 1 is stopped and consequently all the parts which were in movement are stopped, so as to perform closing of the extraction chamber.

During this step the pod-holder is sealed so that it is possible to start dispensing of the beverage; the hot water enters into the top filter unit 7 via a suitable union (not shown), passes through the pod and flows out as a beverage from the outlet opening 14 of the bottom filter unit 11. Dispensing ends once the quantity prechosen for that given function has flowed out.

At this point the top motor 1 is activated again and, with a reverse motion, returns to the previous top position, which may be located by means of an encoder, position microswitch, torque detection system or equivalent systems.

The following step consists in removal of the pod used for dispensing. This operation is performed by simply pulling manually the drawer 30 towards the user.

The top filter unit 7, the worm screw 10, the nut 9, the support 8 and the safety element 13 form a block "A" consisting of parts moved vertically by the motor 1 and by the reduction gear 2 during formation of the beverage.

The bottom filter unit 11 with the drawer 30 forms a block "B" and forms the expulsion system.

The safety element 13 is used, during the downward movement of block "A" and together with detection systems such as microswitches or suitable equivalent systems, to check the presence of an obstacle between the top parts of block A and the bottom parts of block B and, if necessary, interrupt the dispensing cycle.

Advantageously, the pod-holding device 100 may be made of metal, such as aluminium or an alimentary plastic suitable for withstanding the temperatures reached during operation of the machine.

The particular embodiments described here do not limit the content of this application which covers all the variants defined by the claims.

The electronic boards and the software designed to manage the operation of beverage dispensing machines are within the competence of a person skilled in the art. However, the pod-holder according to the invention, owing to its constructional simplicity, allows the use of a firmware for managing simply the operations of the machine. Owing to the presence of firmware it is possible to modify in a simple manner management of the pod-holder and the machine in general.

Below operation of the firmware to be used in beverage dispensing machines provided with the pod-holder according to the present invention is described in summary form.

The presence of firmware results in flexibility with regard to control operations, functional features and any implementation of other features which are to be added subsequently.

In the non-limiting example of embodiment described below, the available functions implemented and controlled by the firmware are as follows:

Long coffee
Espresso coffee
Short coffee
Hot water and may be supplemented by other functions for example for tea, chocolate, etc.

The firmware is responsible for full process control necessary for performing the required function, following an initial check that there exist all the necessary conditions for remaining activated until completion of the cycle.

Figure 17:
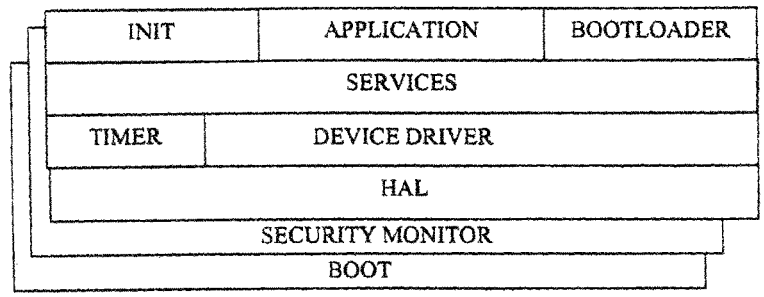
FIG. 17 shows the architecture of the firmware which can be used for beverage dispensing machines in which the pod-holding device according to the invention is housed.

FIG. 17 shows the architecture of the firmware to be used in the beverage dispensing machine, which is organized in the four stratification levels shown in the diagram of the figure representing an example of analysis of the firmware.

The functions BOOT, INIT, APPLICATION and BOOT-LOADER define (at least) 4 separate sessions (or levels) identified as run-levels:

run-level 1: (BOOT) hardware Init;
run-level 2: (INIT) Init of services;
run-level 3: (APPLICATION) Operative level;
run-level 4: (BOOTLOADER) Service level.

Figure 18:
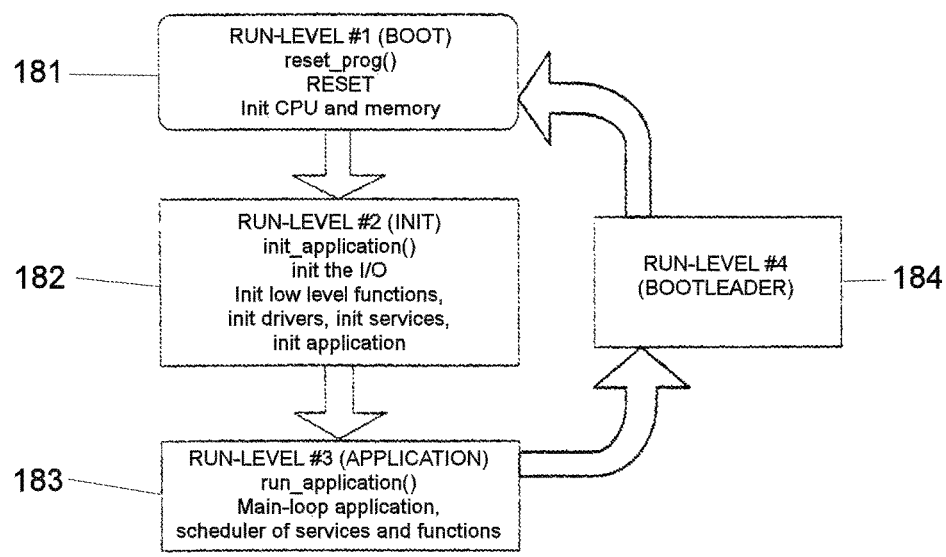
FIG. 18 shows the operating diagram of the firmware.

With the exclusion of run-level 4, which is reached in the case where firmware updating is required, levels 1 and 2 will be carried out sequentially as from reset, followed by execution of run-level 3 on which actual operation of the machine depends, as summarised more clearly in the diagram shown in FIG. 18.

Each run-level activates a set of process which, in a co-operative manner, are carried out following the rules defined during writing of the code.

A simple events mechanism is the basic mechanism which ensures the synchronicity of the processes, the latter often being activated if specific events occur, such as the pressing of a button or the activation of a microswitch.

All the events generated in the firmware of the beverage dispensing machines provided with the pod-holder according to the present invention are, with the exception of evRxChar, the function of which is to manage any communication of the machine with a dedicated software present on a PC, connected to the system timer and provide the main instrument used for scheduling of the processes; they are indicated in Table 1.

TABLE 1

| EVENT | DESCRIPTION |
|---|---|
| ev1mS | Generated by the system timer every ms |
| ev10mS | Generated by the system timer every 10 ms |
| ev100mS | Generated by the system timer every 100 ms |
| ev1Sec | Generated by the system timer every second |
| evRxChar | Generated by the communications driver upon reception of 1 character |

In order to render perfectly functional the final application for management of the machine, a series of services are implemented, these involving the both analog and digital input process, the timers, keyboard and LED management, thermal regulation of the exchanger, etc.

Not all the services are necessarily active at each run-level.

Table 2 below shows the non-limiting list of the services implemented in the firmware of the beverage dispensing machines provided with the pod-holder according to the present invention.

TABLE 2

| THREAD (=PROCESS) | CONDITION | DESCRIPTION |
|---|---|---|
| motors_do( ) | ev10mS | Management of motors |
| Filter_inputs_do( ) | ev10mS | Digital input filter |
| channels_do( ) | ev10mS | Analog channel acquisition and filter |
| keyboard_do( ) | ev10mS | Keyboard management |
| Leds_do( ) | ev10mS | LED management |
| Pump_do( ) | ev10mS | Pump management |
| heaters_do( ) | ev100mS | Heat exchanger regulation |
| do_fault( ) | ev100mS | Machine status monitor |
| update_runtime( ) | ev1Sec | Machine run-time counters |
| ast_do( ) | evRxChar | Communication flow analysis |

The drivers provide access to the hardware or to specific structures of the firmware, displaying, at higher levels, a uniform interface which is as far as possible independent of the parameter being controlled. A driver often uses in turn the interfaces of other drivers; on other occasions the functionality of the driver is implemented in a service. The main drivers implemented in the beverage dispensing machines are, for example, shown in Table 3:

TABLE 3

| DRIVER/ INTERFACE | DESCRIPTION |
|---|---|
| Com | Interface for serial port transmission, reception and communication functions |
| Timers | Timing functions interface |
| i2c | Performs the functions for access to the interface I2C |
| cmdline | Analysis of the character flow received from com |
| parser | Divides the command line into syntactical elements (tokens) |
| lexer | Uses the structure ast (Abstract Syntax Tree) for lexical analysis of the token flow generated by the parser. |
| adconverter | Controls the functionality and access to and from the analog/digital converter |
| inputs | Provides access to the digital inputs of the machine filtered by the respective service |
| motor | Performs the motor control interface |
| pump | Performs the pump control interface |
| heater | Performs the heat exchanger control interface |

The HAL (Hardware Abstraction Layer), together with functions known to the person skilled in the art, provides at higher levels access to the microcontroller resources such as the single input/output port. The description indicated explains its function and the term is known to persons skilled in the art.

Run-level 3 (APPLICATION) implements all the functions intended for the beverage dispensing machine provided with the pod-holder according to the present invention during normal operation thereof.

The application per se is controlled by a finite-state machine (FSM) (known per se) which is implemented in the module "mstate.c" which forms part of the code present at level 3 which determines, depending on the input data received, the operating state of the machine (off, coffee function, etc.).

The states of the FSM in question are listed and briefly described in Table 4 below:

TABLE 4

| STATE | DESCRIPTION |
| --- | --- |
| STS_OFF | The machine appears to the user to be switched off, but this state may be technically defined as STAND-BY. |
| STS_INIT1 | First initialization phase of the machine: the lamp test is performed and the head motor is activated, if necessary, so as to position the corresponding mechanical parts of the machine in the "home" position. |
| STS_INIT2 | Second initialization phase of the machine: the last part of the lamp test is performed and the pod expulsion motor is activated, if necessary, so as to bring the corresponding mechanical parts of the machine into the "home" position. |
| STS_NOT_READY | The machine is not warmed up; the drawer conditions, presence of water, etc., do not allow activation of any functions. |
| STS_READY | The machine is warmed up and is ready to activate the coffee and hot water functions; the drawer conditions, presence of water, etc, allow activation of the functions. |
| STS_OPERATIVE | The machine is performing a coffee or water function. |
| STS_FAULT | A technical problem has been detected. |

Figure 19:
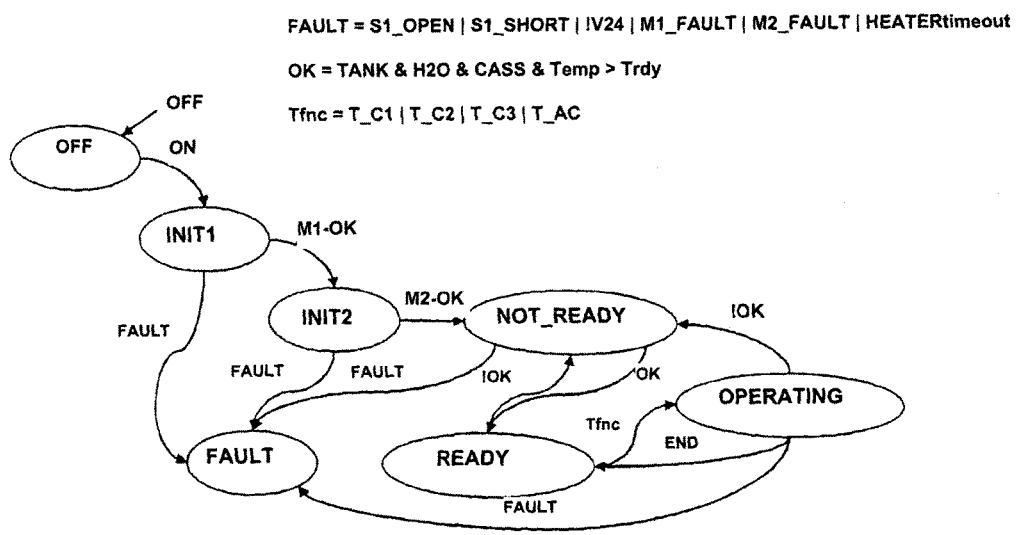
FIG. 19 shows the state transitions of the FSM (Finite State Machine).

The diagram in FIG. 19 shows the state transitions of the FSM.

The advantage of using the firmware determines on the machine the possibility of adding or modifying the existing functions without intervention at the hardware level.

The invention claimed is:

1. A pod-holding device (100) for beverage dispensing machines, suitable for housing pods containing a substance to be extracted or reconstituted by passage of water, the pod-holding device comprising:

a first extraction subunit and a second extraction subunit, wherein the first extraction subunit comprises a top half-shell internally housing a top filter unit (7) configured to sealingly close against a bottom filter holder (11) so as to form, when closed, an extraction chamber for the pod and, when open, allow insertion of said pod between the first extraction subunit and the second extraction subunit, the first extraction subunit being movable and comprising a first motor (1), a transmission screw (10) with associated support (8) and a nut (9) operationally connected to the top half-shell, wherein the second extraction subunit comprises a bottom half-shell containing the bottom filter holder (11) and configured to receive the pod and expel the pod after extraction, wherein the first and the second extraction subunits are housed within a frame having a top plate, a bottom plate and a plurality of support members connecting the top and the bottom plates, wherein the first motor (1) is disposed above and supported by the top plate (5), wherein the transmission screw is operatively coupled to the first motor unit and extends longitudinally into an interior of the frame, wherein the nut is engaged by the transmission screw (10) and moves longitudinally upon a rotation of the transmission screw (10), causing a longitudinal movement of the first extraction subunit, and wherein the bottom plate (6) has a receiving seat therein for the bottom filter holder (11).

2. The pod-holding device according to claim 1, wherein one or both of the top filter unit (7) or the bottom filter holder (11) are provided with a pod piercing system.

3. The pod-holding device according to claim 1, wherein the pod-holding device further comprises a safety element (13) that interrupts operation upon detection of an obstacle between the first and the second extraction subunits.

4. The pod-holding device according to claim 1, wherein the bottom plate (6) houses a second motor (12) operationally connected to the bottom filter holder (11) for expulsion of the pod, and wherein the bottom filter holder (11) has a screw connected to the second motor unit (12), the screw rotating the bottom filter holder to cause expulsion of the pod contained therein.

5. The pod-holding device according to claim 1, wherein the receiving seat in the bottom plate (6) is formed so as to allow a manual sliding toward an exterior environment of an extractable drawer (30) housing internally the bottom filter holder (11), the extractable drawer sliding inside an associated sliding seat (31) formed in the bottom plate (6).

6. A beverage dispensing machine comprising the pod-holding device according to claim 1.

7. The pod-holding device according to claim 4, wherein the screw allows rotating the bottom filter holder with respect to a horizontal axis at an angle of about 90 degrees or less.

8. The pod-holding device according to claim 7, wherein the angle of 90 degrees or less is an angle between 20° to 65°.

* * * * *